(12) United States Patent
Östhols

(10) Patent No.: US 7,629,281 B2
(45) Date of Patent: Dec. 8, 2009

(54) CERAMIC MATERIAL AND CUTTING TOOLS MADE THEREOF

(75) Inventor: Erik Östhols, Huddinge (SE)

(73) Assignee: Sandvik Intellectual Property AB, Sandviken (SE)

( * ) Notice: Subject to any disclaimer, the term of this patent is extended or adjusted under 35 U.S.C. 154(b) by 222 days.

(21) Appl. No.: 12/000,874

(22) Filed: Dec. 18, 2007

(65) Prior Publication Data

US 2008/0167174 A1 Jul. 10, 2008

(30) Foreign Application Priority Data

Dec. 27, 2006 (SE) .................................. 0602810

(51) Int. Cl.
*C04B 35/599* (2006.01)
(52) U.S. Cl. ...................... 501/98.2; 428/698; 428/702; 428/704; 428/446
(58) Field of Classification Search ................ 501/98.2; 428/446, 698, 702, 704
See application file for complete search history.

(56) References Cited

U.S. PATENT DOCUMENTS

| 4,818,635 | A | * | 4/1989 | Ekstrom et al. ............. 428/698 |
| 5,370,716 | A | | 12/1994 | Mehrotra et al. |
| 5,432,132 | A | | 7/1995 | Dasgupta et al. |
| 5,965,471 | A | | 10/1999 | Brandt |

FOREIGN PATENT DOCUMENTS

| GB | 2 155 007 A | 9/1985 |
| GB | 2 157 282 A | 10/1985 |
| JP | 2005-231928 | 9/2005 |
| WO | 2005/016847 A | 2/2005 |

OTHER PUBLICATIONS

Ayas et al., "Production of α-β SiAlON-TiN/TiCN Composites by Gas Pressure Sintering", Silicates Industriels 69(7-8) 287-292 (1992).
Becher et al., "Compositional Effects on the Properties of Si-Al-RE-Based Oxynitride Glasses (RE=La, Nd, Gd, Y or Lu)", J. Am. Ceram. Soc. 85(4), 897-902 (2002).
Ekström et al., "SiAlON Ceramics", J. Am. Ceram. Soc. 75(2), 259-276 (1992).
Fang-Fang et al.,"Nucleation and Growth of the Elongated α'-SiAlON", J. Eur. Ceram. Soc. 17(13) 1631-1638 (1997).
Hill et al., "Quantitative Phase Analysis from Neutron Powder Diffraction Data Using the Rietveld Method", J. Appl. Cryst. 20, 467-474 (1987).
Hong et al., "The effect of additives on sintering behavior and strength retention in silicon nitride with RE-disilicate", J. Eur. Ceram. Soc. 22, 527-534 (2002).

(Continued)

*Primary Examiner*—Karl E Group
(74) *Attorney, Agent, or Firm*—Drinker Biddle & Reath LLP

(57) ABSTRACT

The present invention relates to a ceramic material consisting of β-sialon ($Si_{6-z}Al_zO_zN$), polytype 12H, an intergranular amorphous or partly crystalline phase, and containing yttrium with a z-value of from about 0.7 to less than about 1.5. The ceramic material is useful as cutting tool insert for machining of heat resistant super alloys, with good notch wear, acceptable flank wear and sufficient toughness.

6 Claims, 2 Drawing Sheets

OTHER PUBLICATIONS

Izhevskiy et al., "Progress in SiAlON ceramics", J. Eur. Ceram. Soc. 20, 2275-2295 (2000).

Rietveld, H.M., "A Profile Refinement Method for Nuclear and Magnetic Structures", J. Appl. Cryst. 2, 65-71 (1969).

Rietveld, H.M., "Line profiles of neutron powder-diffraction peaks for structure refinement", Acta Cryst. 22, 151-152 (1967).

Sun et al., "Microstructural Design of Silicon Nitride with Improved Fracture Toughness II: Effects of Yttria and Alumina Additives", J. Am. Ceram. Soc. 81(11) 2831-2840 (1998).

* cited by examiner

US 7,629,281 B2

CERAMIC MATERIAL AND CUTTING TOOLS MADE THEREOF

BACKGROUND OF THE INVENTION

The present invention relates to a ceramic silicon nitride based material suitable for machining of nickel- and cobalt-based materials, sometimes designated as heat resistant super alloys (HRSA) with good notch wear, acceptable flank wear and sufficient toughness.

Ceramic materials for cutting tool applications are, thanks to their high hot hardness, suitable for machining work-piece materials of high hardness, high tensile strength at elevated temperatures and low heat-diffusivity, and particularly so for self-hardening materials such as, e.g., some types of nickel- and cobalt-based materials, sometimes designated as heat resistant super alloys (HRSA).

Many silicon nitride based materials for cutting tools are manufactured using aluminum oxide ($Al_2O_3$) as a sintering aid. Aluminum and oxygen have the ability to replace silicon and nitrogen respectively in the crystal structure of silicon nitride, thereby creating a so-called sialon ceramic, Si—Al—O—N, sometimes additionally stabilized by a cation $Me^{n+}$, where Me can be chosen from a large number of (rare-earth) metals and lanthanides of suitable ionic radius (r<1.0 Å), such as Y, Yb, Dy, Lu, Li, Ca, Mg, Sc etc.

Many sialon phases have been detected and characterized, see e.g., Izhevskiy et al., "Progress in SiAlON ceramics", J. Eur. Ceram. Soc. 20, 2275-2295 (2000), but the predominant phases used in cutting tool materials remain α-sialon phase, $R_xSi_{12-(m+n)}Al_{(m+n)}O_nN_{(16-n)}$ (1.0 less than about m less than about 2.7; n less than about 1.2), where R is one of the aforementioned metals or lanthanides with ionic radius less than about 1.0 Å, and β-sialon: $Si_{6-z}Al_zO_zN_{8-z}$ were z is greater than zero and less than about 4.2.

During sintering, the raw materials used, usually a mixture of silicon nitride, alumina and AlN or some sialon "polyphase" (or "polytype"), such as 12H, 21R etc., together with an oxide of the metal or lanthanide, form a transitionary melt from which the α- and β-sialon phases, and possibly other phases such as (if Y is used as the metal ion R mentioned above) YAG, melilite, B-phase, 12H etc. crystallize. After sintering, an intergranular phase between the crystalline grains remains. The amount of intergranular phase produced is influenced by the composition of raw materials used, as well as the sintering conditions.

Besides stabilizing the α-sialon phase, the metal ion also functions as a catalyst for the formation of sialon crystals during sintering, and aids the formation of elongated sialon grains, usually in the beta phase, but elongated grains of α-sialon have also been produced. Fang-Fang et al, "Nucleation and Growth of the Elongated α'-SiAlON", J. Eur. Ceram. Soc. 17(13) 1631-1638 (1997). It is also clear, that the choice of metal ion used affects the properties of the amorphous phase. Fang-Fang X, Shu-Lin W, Nordberg L-O and Ekström T, "Nucleation and Growth of the Elongated α'-SiAlON", J. Eur. Ceram. Soc. 17(13) 1631-1638 (1997); Sun et al., "Microstructural Design of Silicon Nitride with Improved Fracture Toughness II: Effects of Yttria and Alumina Additives", J. Am. Ceram. Soc. 81(11) 2831-2840 (1998); Hong et al., "The effect of additives on sintering behavior and strength retention in silicon nitride with RE-disilicate", J. Eur. Ceram. Soc. 22, 527-534 (2002); Becher et al., "Compositional Effects on the Properties of Si—Al—RE-Based Oxynitride Glasses (RE=La, Nd, Gd, Y or Lu)", J. Am. Ceram. Soc. 85(4), 897-902 (2002).

The z-value in the β-sialon phase, $Si_{6-z}Al_zO_zN_{8-z}$, affects the hardness, toughness, and grain size distribution in the sintered material. Ekström et al., "SiAlON Ceramics", J. Am. Ceram. Soc. 75(2), 259-276 (1992). The z-value relates to the amount of Al and O dissolved in the $Si_3N_4$-lattice. A theoretical z-value can be calculated from the composition of the starting materials. The actual z-value of the beta sialon phase after sintering can be measured by X-ray diffraction analysis. The measured z-values are always somewhat lower than those calculated since the intergranular phase contains more oxygen and alumina than the beta sialon phase.

GB-A-2157282 discloses a range of sialon materials suitable for use in metal cutting tools, with and without α-sialon, refractory additions such as TiN and SiC, with or without crystalline AlN etc., but always containing a "polytype" sialon phase.

U.S. Pat. No. 5,370,716 discloses a ceramic material for use as a cutting tool in the high speed machining of high temperature alloys and cast irons with a composition of β-sialon ($Si_{6-z}Al_zO_zN_{8-z}$ where 1<z<3) and intergranular phase.

U.S. Pat. No. 5,965,471 discloses a sintered ceramic material for high speed machining of heat resistant alloys comprising sialon grains and 0.2-20 v/o intergranular phase. At least 80 v/o of said sialon phase is β-sialon having a z-value 1-1.5. The ceramic material has a Vickers Hardness HV1 of more than 1530 and it is produced by gas pressure sintering.

OBJECTS AND SUMMARY OF THE INVENTION

It is an object of the present invention to provide silicon nitride based ceramic materials for metal cutting tool purposes with optimal compositions for machining metals, preferably heat resistant super alloys, with good notch wear, acceptable flank wear and sufficient toughness.

In one embodiment of the invention, there is provided a ceramic material of β-sialon ($Si_{6-z}Al_zO_zN$), polytype 12H, an intergranular amorphous or partly crystalline phase, and containing yttrium wherein the amount of intergranular phase, measured as the area attributable to this phase in a SEM picture relative to the total area of the picture, is between about 5 and about 15%, the z-value is from about 0.7 to less than about 1.5; the amount of polytype 12H, measured as the ratio of the height in a Cu—Kα x-ray diffractogram of the 12H peak at a 2Θ value of 34° and the height in the same diffractogram of the β-sialon peak at a 2Θ value of 33° is between about 2 and about 20%, and the yttrium content is from about 3.5 to about 5 wt-%.

In another embodiment of the invention, there is provided a cutting tool for chipforming metal machinery made of the above-identified ceramic material.

DETAILED DESCRIPTION OF THE PREFERRED EMBODIMENTS

Figure 1:
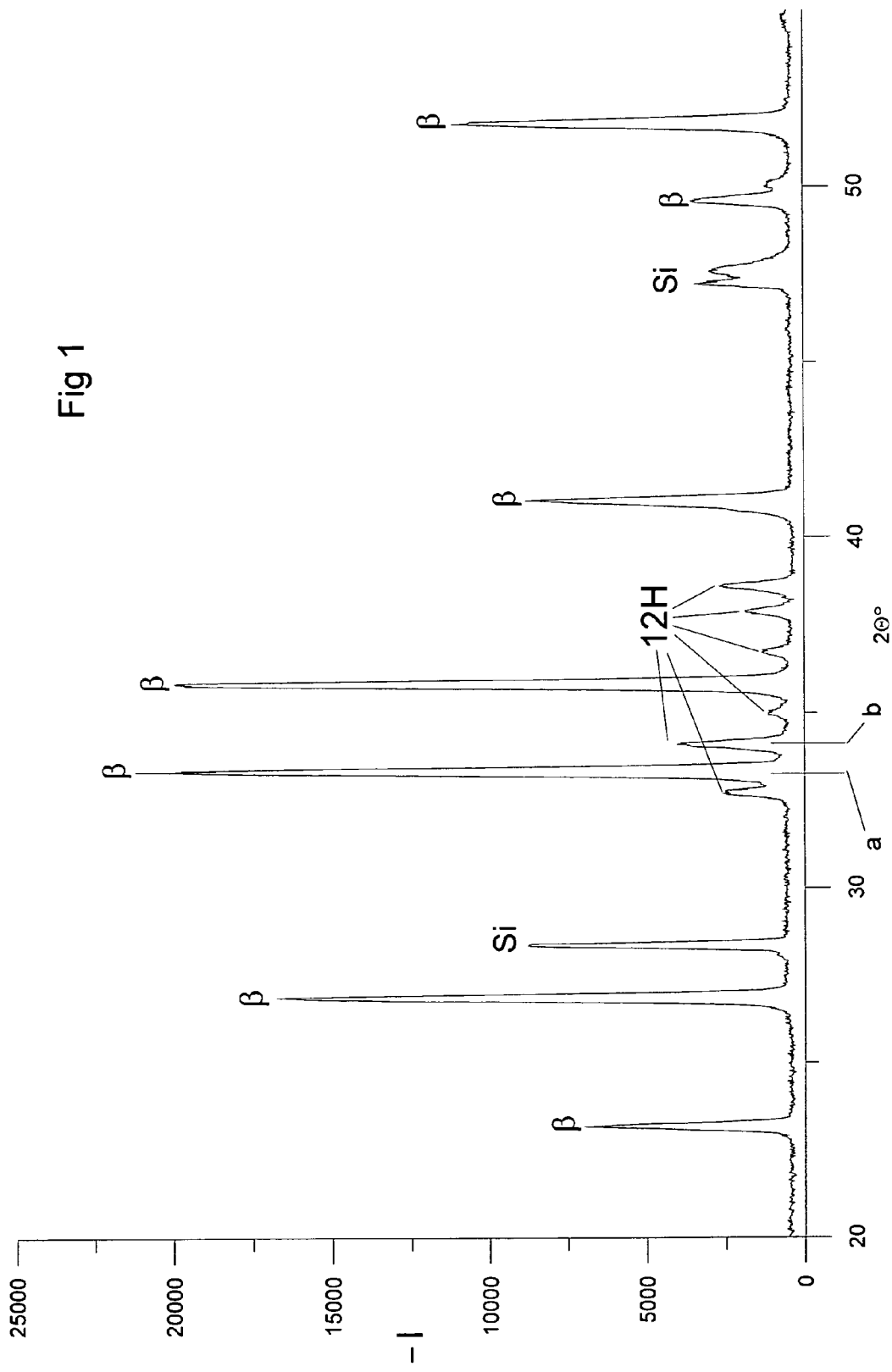
FIG. 1 shows an X-ray diffraction pattern from a sialon material according to the invention in which β refers to β-sialon, 12H to the polytype 12H ($6AlN.SiO_2$), and Si marks peaks from silicon added as an internal standard.

The present invention provides a ceramic material based on β-sialon ($Si_{6-z}Al_zO_zN$), polytype 12H, an intergranular amorphous or partly crystalline phase, and containing from about 3.5 to about 5 wt-%, preferably from about 3.9 to about 4.5 wt-%, yttrium. The β-sialon phase has a z-value of from about 0.7 to less than about 1.5. The amount of intergranular phase is between about 5 and about 15%. The amount of polytype 12H, measured as the ratio of the peak height in an x-ray diffractogram of the CuKα peak at a 2Θ value of 34° (a) and the peak height in the same diffractogram of the peak from β-sialon at a 2Θ value of 33° (b) is between about 2 and about 20%, taking the background into consideration. In addition, the material may contain up to about 3 percent by weight of YAG, B-phase and/or melilite.

The material is particularly useful for cutting tool inserts for machining of heat resistant super alloys (HRSA). Such cutting tool inserts can be provided with coatings of TiN, Ti(C,N), $Al_2O_3$ or (Ti,Al)N or any combination thereof.

Sialon material according to the invention is made by powder metallurgical methods such as milling, pressing and sintering. Suitable proportions of powders of silicon nitride, alumina, yttria and aluminum nitride or polyphase 21 R are milled and pressed to insert blanks. The insert blanks are placed on sintering trays without embedding in a powder bed and burnt off separately, and then sintered in a gas pressure sintering furnace. The final part of the sintering shall take place at from about 1700 to about 1900° C. under nitrogen pressure.

After sintering, the blanks are ground to inserts for metal cutting of desired shape and dimension. The inserts are optionally provided with coatings of TiN, Ti(C,N), $Al_2O_3$ or (Ti,Al)N or any combination thereof as known in the art.

In one exemplary embodiment of the present invention, the z-value is from about 0.7 to about 1.3, preferably from about 0.7 to less than about 1, and the amount of 12H polytype is between about 5 and about 20%, preferably from about 6 to about 15%.

In another exemplary embodiment of the present invention, the z-value is from about 1.2 to less than about 1.5, preferably from about 1.25 to less than about 1.45, and the amount of 12H polytype is between about 2 and about 15%, preferably from about 2 to about 12%.

The invention is additionally illustrated in connection with the following examples, which are to be considered as illustrative of the present invention. It should be understood, however, that the invention is not limited to the specific details of the examples.

EXAMPLES

Powder raw materials B, C, F and H according to the compositions in Table 1a, except materials E and G, which are commercially available sialon cutting tools, were milled in water, using sialon milling media. Composition C and H have the same raw materials compositions, but differ in the degree of milling. Composition H was subjected to a more intensive milling, which increases the oxygen content of the slurry. Organic binders were mixed into the slurry, which was then granulated through spray drying.

The powders were cold-pressed uniaxially to form green bodies, which were then burnt off separately at 650° C. The burnt off green bodies were then sintered under nitrogen pressure at a maximum sintering temperature of 1810° C. The sintered bodies were ground to inserts of ISO RPGX120700T01020 type.

The materials were analyzed metallographically with regard to porosity. X-ray diffraction was used to determine the z-value and the amount of 12H polytype was determined as the ratio of the height of the 12H CuKα X-ray diffraction peak at a 2θ angle of 34 degrees to the height of the β-sialon peak at 33 degrees, see FIG. 1.

Figure 2:
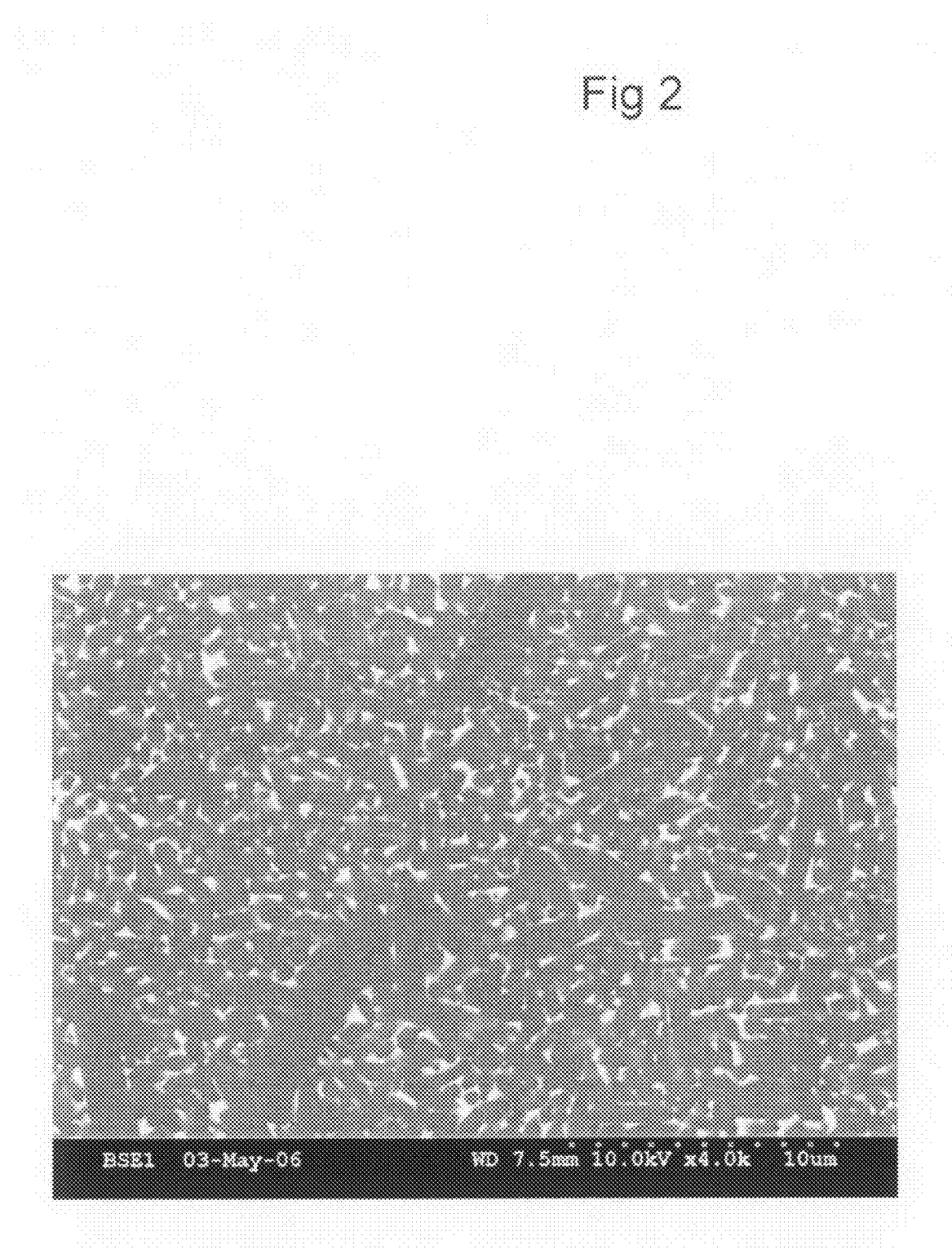
FIG. 2 is a SEM (Scanning Electron Microscope) micrograph in 4000× magnification in backscattered mode of a sialon material according to the present invention in which the grey grains are β-sialon or, in a few cases, 12H polytype, and the lighter areas are intergranular phase.

FIG. 2 is a SEM (Scanning Electron Microscope) micrograph in 4000× magnification in backscattered mode of the sialon material C. The grey areas are β-sialon and 12H polytype and the white areas are intergranular phase. The amount of intergranular phase, measured as the area attributable to this phase, relative to the total area of the picture, is 10%.

TABLE 1a

Composition, wt-% raw material

| Material | $Si_3N_4$ | $Al_2O_3$ | 21R-F | $Y_2O_3$ | TiN |
|---|---|---|---|---|---|
| B | 58.35 | 7.90 | 14.54 | 4.24 | 16.3 |
| C | 68.62 | 9.28 | 17.11 | 4.99 | 0 |
| E | N/A | N/A | N/A | (7% Yb) | 0 |
| F | 68.86 | 15 | 10.69 | 4.99 | 0 |
| G | N/A | N/A | N/A | N/A | 0 |
| H | 68.62 | 9.28 | 17.11 | 4.99 | 0 |

TABLE 1b

Composition and properties, sintered material.

| Material | Measured z-value | wt-% Beta-sialon[5] | % 12H[1] | wt-% alpha-sialon[5] | Y wt-% | Porosity[2] | Intergranular phase, %[3] |
|---|---|---|---|---|---|---|---|
| B | 0.94 | N/A[4] | 20 | — | 3.64 | A02/B00 | 9 |
| C | 0.9 | N/A[4] | 15 | — | 3.93 | A02/B00 | 14 |
| E | 0.59 | 70 | 0 | 30 | 7 (Yb) | A00/B00 | 11 |
| F | 1.4 | 100 | 0 | — | 3.93 | A04/B00 | 10 |
| G | 1.7 | 100 | 0 | — | 3.5 | A02/B00 | 13 |
| H | 1.3 | N/A[4] | 5 | — | 3.93 | A02/B00 | 14 |

[1]Measured as the ratio of the height in an x-ray diffractogram of the 12H peak at a 2Θ value of 34° and the height in the same diffractogram of the β-sialon peak at a 2Θ value of 33°
[2]According to ISO 4505 Standard on Metallographic Determination of Porosity
[3]Measured as the area attributable to this phase in a SEM picture relative to the total area of the picture.
[4]Since the percentage of 12H cannot be measured quantitatively, it is not possible to determine the proportion of beta-sialon.
[5]Expressed as the proportion of the crystalline material in the sample, detectable by X-ray diffraction.

Example 1

Inserts according to compositions B, C and F in Table 1 were tested in a longitudinal turning operation in Inconel 718 using a speed of 225 m/min, feed 0.1 mm/rev and a cutting depth of 2.5 mm. Coolant was used. The inserts were run in test cycles, where one test cycle corresponds to 30 s of machining time. Two test runs, each with a fresh set of inserts, were made, and the number of cycles survived by each insert until a notch wear of 1 mm or flank wear depth (VB) of 0.5 mm were recorded. The resulting life spans, in minutes, as averages over the two test runs, are shown in Table 2. Variant C showed a clear advantage in terms of resistance to flank wear and notch wear. Variant B, essentially the same as variant C in terms of composition, but with TiN added, showed pronounced notch wear which was also the life length limiting factor for variant B.

TABLE 2

| Material | Average life length (min) |
|---|---|
| B | 1.5 |
| C | 3.5 |
| F | 2.75 |

Example 2

Inserts according to compositions B, C, F and G in Table 1 were tested in a double facing operation against a shoulder in Inconel 718 using a speed of 280 m/min, feed 0.2 mm/rev and a cutting depth of 2.5+2.5 mm. Coolant was used. The inserts were run in test cycles, where one test cycle corresponds to the described facing operation, in three test runs, each with a fresh set of inserts. The number of cycles survived by each insert until edge breakage or a flank wear depth (VB) of 1.0 mm or more was recorded. The results, as averages over all three test runs, are shown in Table 3. Material C again, and material with composition H, perform best of the tested materials.

TABLE 3

| Material | Average life length, no. of cycles |
|---|---|
| B | 6.3 |
| C | 13.7 |
| F | 7 |
| G | 9.7 |
| H | 15.3 |

Example 3

Inserts according to compositions C, E, F and G in Table 1 were tested in a double facing operation against a shoulder in Inconel 718 using a speed of 250 m/min, feed 0.2 mm/rev and a cutting depth of 2.5+2.5 mm. Coolant was used. The inserts were run in test cycles, where one test cycle corresponds to the described facing operation, in three test runs, each with a fresh set of inserts. The number of cycles survived by each insert until edge breakage or a flank wear depth (VB) of 1.0 mm or more was recorded. The results, as averages over all three test runs, are shown in Table 4.

Material C, a β-sialon with a z-value of 0.9, has a performance very close to material E, which is a commercially available α/β-sialon with a z-value around 0.6, which would normally be expected to have significantly higher toughness than material C.

TABLE 4

| Material | Average life length (no. of cycles) |
|---|---|
| C | 9.7 |
| E | 10 |
| F | 6 |
| G | 8.7 |

Example 4

Inserts according to compositions C and E in Table 1 were tested in a longitudinal turning operation in Inconel 718 using a speed of 225 m/min, feed 0.124 mm/rev and a cutting depth of 1.5 mm. Coolant was used. The inserts were run in test cycles, where one test cycle corresponds to 30 s of machining time. Three test runs, each with a fresh set of inserts, were made, and the number of cycles survived by each insert until a notch wear length or flank wear depth (VB) of 0.5 mm. The results, as averages over the test runs, are shown in Table 5. Variant C shows longer life length than variant E.

TABLE 5

| Material | Average life length (min) |
|---|---|
| C | 3.75 |
| E | 3.2 |

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A ceramic material of β-sialon ($Si_{6-z}Al_zO_zN$), polytype 12H, an intergranular amorphous or partly crystalline phase, and containing yttrium wherein:
    the amount of intergranular phase, measured as the area attributable to this phase in a SEM picture relative to the total area of the picture, is between about 5 and about 15%,
    the z-value is from about 0.7 to less than about 1.5
    the amount of polytype 12H, measured as the ratio of the height in a Cu—Kα x-ray diffractogram of the 12H peak at a 2Θ value of 34° and the height in the same diffractogram of the β-sialon peak at a 2Θ value of 33° is between about 2 and about 20%, and,
    the yttrium content is from about 3.5 to about 5 wt-%.

2. A ceramic material of claim 1 wherein the z-value is from about 0.7 to about 1.3 and the amount of 12H polytype is between about 5 and about 20%.

3. A ceramic material of claim 1 wherein the z-value is from about 1.2 to less than about 1.5 and the amount of 12H polytype is between about 2 and about 15%.

4. A ceramic material of claim 1 wherein the yttrium content is from about 3.9 to about 4.5 wt-%.

5. A cutting tool insert for chipforming metal machining made of a material of claim 1.

6. Cutting tool insert of claim 5 provided with coatings of TiN, Ti(C,N), $Al_2O_3$ or (Ti,Al)N or any combination thereof.

* * * * *